US010235154B2

(12) United States Patent
Vangelov

(10) Patent No.: US 10,235,154 B2
(45) Date of Patent: Mar. 19, 2019

(54) OVER-THE-AIR TRIGGER TO VEHICLE INTERROGATOR UPDATES

(71) Applicant: FORD GLOBAL TECHNOLOGIES, LLC, Dearborn, MI (US)

(72) Inventor: John Naum Vangelov, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 15/064,931

(22) Filed: Mar. 9, 2016

(65) Prior Publication Data

US 2017/0262274 A1    Sep. 14, 2017

(51) Int. Cl.
    *G06F 8/65*    (2018.01)

(52) U.S. Cl.
    CPC ...................... *G06F 8/65* (2013.01)

(58) Field of Classification Search
    None
    See application file for complete search history.

(56) References Cited

U.S. PATENT DOCUMENTS

| 7,103,460 | B1 * | 9/2006 | Breed | B60C 23/0408 |
| | | | | 701/29.1 |
| 9,604,651 | B1 * | 3/2017 | Amireddy | B60W 50/08 |
| 2005/0149922 | A1 * | 7/2005 | Vincent | G06F 8/67 |
| | | | | 717/172 |
| 2009/0300595 | A1 | 12/2009 | Moran et al. | |
| 2014/0006555 | A1 | 1/2014 | Shields | |
| 2015/0007155 | A1 * | 1/2015 | Hoffman | G06F 8/65 |
| | | | | 717/168 |
| 2015/0121457 | A1 | 4/2015 | Schwarz et al. | |
| 2015/0193219 | A1 | 7/2015 | Pandya et al. | |
| 2015/0193220 | A1 | 7/2015 | Rork et al. | |
| 2015/0277942 | A1 | 10/2015 | Rork et al. | |
| 2015/0281374 | A1 | 10/2015 | Petersen et al. | |
| 2015/0286475 | A1 | 10/2015 | Vangelov et al. | |
| 2015/0288636 | A1 | 10/2015 | Yalavarty et al. | |
| 2016/0013934 | A1 * | 1/2016 | Smereka | G06F 21/572 |
| | | | | 713/171 |
| 2016/0294614 | A1 * | 10/2016 | Searle | H04L 41/082 |

\* cited by examiner

*Primary Examiner* — Philip Wang
*Assistant Examiner* — Rongfa P Wang
(74) *Attorney, Agent, or Firm* — Frank L. Lollo; Brooks Kushman P.C.

(57) ABSTRACT

A vehicle may subscribe to a topic of a topic tree maintained by a message broker and associated with the vehicle. The vehicle may send, to a service delivery network, an interrogator log enumerating configuration information of the vehicle generated responsive to a trigger message published to the topic by the network, and retrieve a manifest indicating network locations of updates determined by the network from the interrogator log.

19 Claims, 4 Drawing Sheets

OVER-THE-AIR TRIGGER TO VEHICLE INTERROGATOR UPDATES

TECHNICAL FIELD

The illustrative embodiments generally relate to a method and apparatus for performing over-the-air software updates responsive to a published over-the-air trigger to perform vehicle interrogation.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

Over-the-air (OTA) software updates are a technique by which software of a vehicle may be updated via a wireless connection. Using an embedded modem or other wireless data connection to the vehicle, OTA updates allow software changes on vehicle electronic control units (ECUs) without a dealership visit.

SUMMARY

In a first illustrative embodiment, a system includes a vehicle, subscribed to a topic maintained by a message broker and associated with the vehicle, including at least one controller programmed to send, to a service delivery network server, an interrogator log enumerating configuration information of the vehicle generated responsive to a trigger message published to the topic by the server, and retrieve a manifest indicating network locations of updates determined using the interrogator log.

In a second illustrative embodiment, a method includes receiving, by a vehicle processor, a message published by a service delivery network to a topic maintained by a message broker and associated with a vehicle indicating vehicle update availability; generating an interrogator log enumerating vehicle configuration information responsive to receiving the message; sending the interrogator log to the service delivery network; and retrieving, from the service delivery network, a manifest indicating network locations of updates determined using the interrogator log.

In a third illustrative embodiment, a non-transitory computer-readable medium includes instructions that when executed by a computing system of a vehicle cause the vehicle to retrieve a manifest of service delivery network locations for updates served by a web server, the updates selected based on a log having vehicle configuration information compiled by the vehicle computing system in response to receiving a message published to a vehicle-subscribed topic maintained by a message broker indicating vehicle update availability.

DETAILED DESCRIPTION

Figure 1:
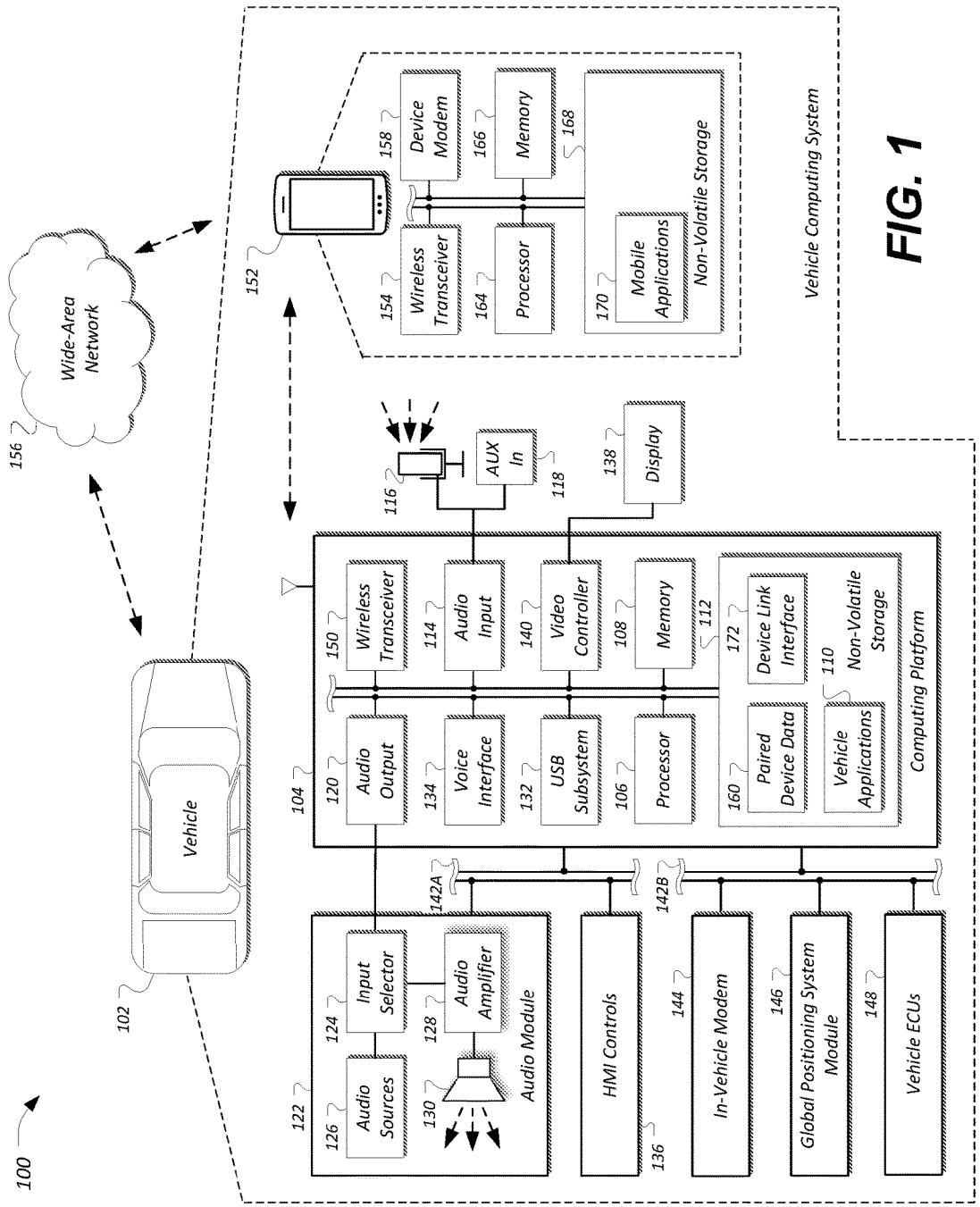
FIG. 1 illustrates an example block topology for a vehicle-based computing platform.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A software update system may utilize a publish/subscribe model to publish messages to and from vehicles. The publish/subscribe model may utilize topics, also known as logical channels, through which publishers may send messages and subscribers may receive messages. In some cases, a vehicle may be a publisher and may send vehicle alerts to a service delivery network, respond to commands from the service delivery network, or notify the service delivery network of vehicle connectivity status. In other cases, a vehicle may be a subscriber and may receive control messages or indications of available software updates from a service delivery network.

A topic tree structure may be utilized to define a structure of the topics and sub-topics used in sending messages between the vehicles and the service delivery network. A computing platform of the vehicle may subscribe to nodes of the topic tree that correspond to the installed software/firmware version of one or more modules included within the vehicle. These modules may include, as one example, a telematics unit (TCU).

A service delivery network may receive notification for a software update from a publisher. The notification may result in the service delivery network publishing a trigger notification message in a topic node corresponding to a vehicle to be updated or a version of the software to be updated. The service delivery network may further publish the software update binary to a web server at a web address specific to the update. The publisher may be a remote original equipment manufacturer (OEM) server or a third-party software provider.

The vehicle may generate an interrogator log based upon receipt of the trigger message notification in the topic tree indicating that updates are available. The interrogator log may include version information of at least one hardware or software module installed on the vehicle, and may be used to determine what modules to update. The interrogator log may include information compiled in accordance with a data identifier list defining what information to include in the interrogator log and where such information is located in the active software installation.

The vehicle may be configured to send the interrogator log to the service delivery network. In an example, the vehicle may send the interrogator log to an address of the service delivery network over a secure hyper-text transport protocol (HTTPS) connection. The service delivery network may receive the interrogator log, and respond to the vehicle with a manifest based on the information included in the provided interrogator log. The manifest may indicate web server locations of at least one software update to be installed by the vehicle, and may be provided back to the vehicle over HTTPS.

Based on the manifest, the vehicle may be configured to install updated binaries and/or configurations retrieved from the specified web server locations. As the updates may be made available from the web server, the vehicles may be able to download the updates using resume functionality available from web server downloads. Moreover, as the interrogator log generation and upload is performed responsive to a service notification that updates are available, periodic polling by the vehicle for updates is avoided, thereby avoiding the resource use of periodically generating and uploading interrogator logs. Further aspects of the system are discussed in detail below.

FIG. 1 illustrates an example diagram of a system 100 that may be used to provide telematics services to a vehicle 102. The vehicle 102 may be of various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e. g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH® audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, or a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle electronic control units (ECUs) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors, and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH® module, a ZIGBEE® transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., media access control (MAC) addresses, mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired mobile device 152 and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional information or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

The computing platform 104 may also include a device link interface 172 to facilitate the integration of functionality of the mobile applications 170 into the grammar of commands available via the voice interface 134. The device link interface 172 may also provide the mobile applications 170 with access to vehicle features, such as information available to the computing platform 104 via the in-vehicle networks 142 or access to the display 138. An example of a device link interface 172 may be the SYNC APPLINK component of the SYNC system provided by The Ford Motor Company of Dearborn, Mich.

Figure 2:
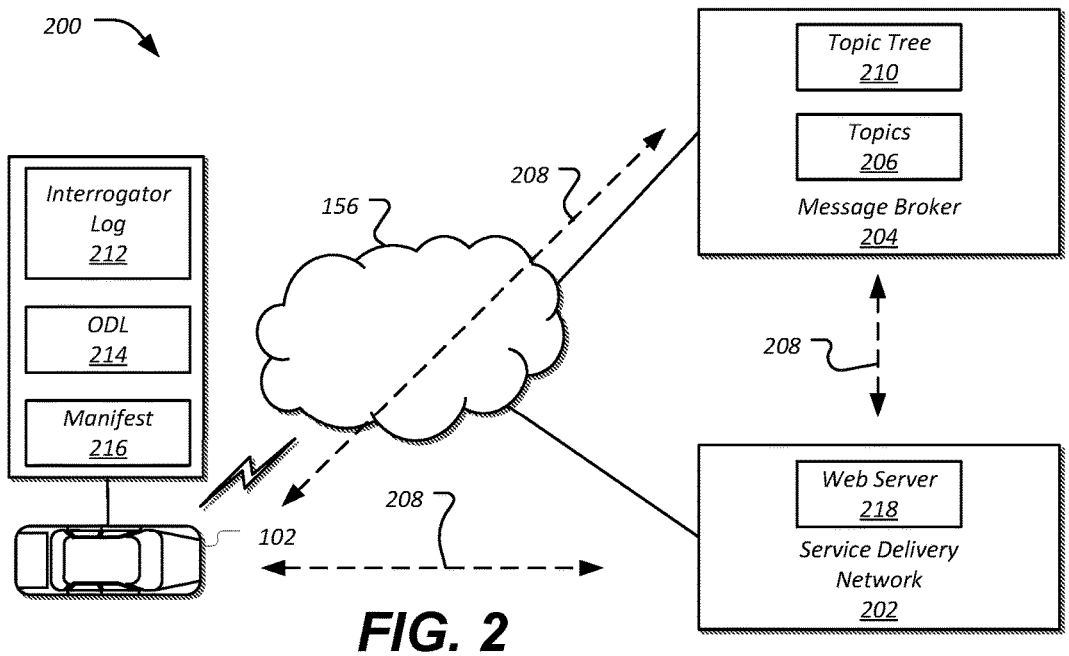
FIG. 2 illustrates an exemplary service delivery network in communication over the network with a vehicle having a configurable module.

FIG. 2 illustrates an exemplary diagram 200 of a service delivery network 202 in communication over the network 156 with a vehicle 102 by way of a message broker 204. The vehicle 102 may be in wireless communication with the network 156 by way of the computing platform 104 of the vehicle 102. When a vehicle 102 is assembled, the vehicle 102 may include various hardware and software components. Upon or after assembly, a computing platform 104 of the vehicle 102 may be configured to query for existence and version information for at least a portion of these hardware and software components of the vehicle 102. Using the queried information and additional information identifying the specific vehicle 102 (e.g., vehicle identification number (VIN) information published on the car area network (CAN) bus, subscriber identity module (SIM) information of the vehicle modem 144 such as international mobile station equipment identity (IMEI), etc.), the computing platform 104 may communicate via the network 156 and message broker 204 to establish an account with the service delivery network 202. The service delivery network 202 may receive these communications from the vehicles 102, and may maintain a data store of the hardware configurations and software (e.g., firmware, etc.) versions linked to identifiers of the vehicles 102.

The message broker 204 may additionally provide publish/subscribe messaging functionality for communication between the service delivery network 202 and the vehicles 102. The publish/subscribe model may utilize one or more topics 206, where topics 206 are named logical channels through which publishers may send messages 208 and subscribers may receive messages 208. Rather than receiving all the messages 208, subscribers to the topics 206 receive the messages 208 published to the topics 206 to which they subscribe, and all subscribers to a topic 206 will receive substantially the same topic messages 208.

Figure 3A:
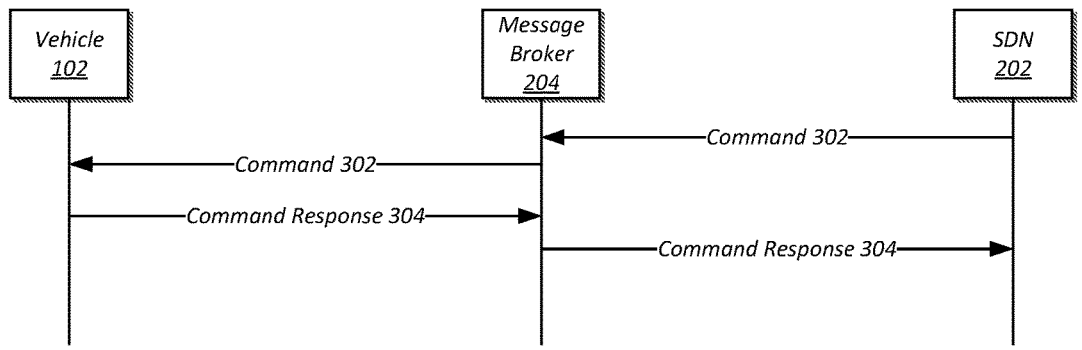
FIGS. 3A and 3B illustrate exemplary communications flows of messages between the vehicle and the service delivery network via the message broker.
Figure 3B:
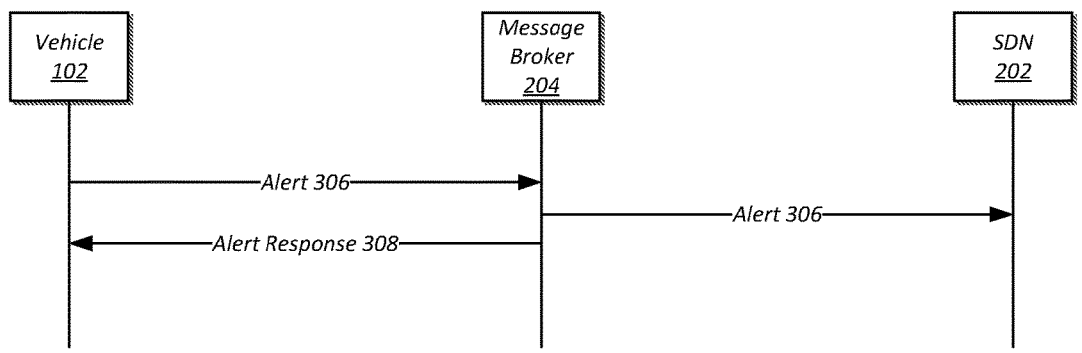

FIGS. 3A and 3B illustrate exemplary communications flows of messages 208 between the vehicle 102 and the service delivery network 202 via the message broker 204. Messages 208 may be of various categories, such as commands 302, command responses 304, and alerts 306.

As shown in FIG. 3A, a command 302 may be published by the service delivery network 202 to a topic of the message broker 204 that is subscribed to by vehicle 102. A command 302 is a type of message 208 that requests a recipient of the command 302 to perform an action specified by the command 302. A command response 304 is a message 208 provided back to a sender responsive to receipt of a command 302. The response 304 to the command 302 may be published by the vehicle 102 to a topic 206 subscribed to by the service delivery network 202.

As shown in FIG. 3B, an alert 306 may be published by the vehicle 102 to a topic of the message broker 204 subscribed to by the service delivery network 202. An alert 306 is a type of message 208 providing information from a sender to a recipient, without requesting the performance of a particular action. Responsive to the alert 306, the message broker 204 may publish an alert response 308 to the vehicle 102, as the service delivery network 202 is not required to provide a response to the alert 306.

A publisher of the messages 208 may be responsible for providing messages 208 to the topics 206 that are consistent with the topic 206. The publisher may include, for example for commands 302, an OEM or other entity responsible for maintaining and/or updating vehicle software/firmware. In some cases, a vehicle 102 may be a publisher and may send vehicle alerts 306 to a topic 206 subscribed to by the service delivery network 202, may use alerts 306 notify the service delivery network 202 of vehicle 102 connectivity status to the network 156, or may respond to messages 208 from the service delivery network 202 with command responses 304. In other cases, a vehicle 102 may be a subscriber and may receive commands 302 or other information from a service delivery network 202 via the message broker 204.

The messages 208 may utilize a name/value pair model allowing for data elements of the messages 208 to be defined and referenced by vehicles 102 and the service delivery network 202 by name. Each message 208 may include certain base fields present in all messages 208. Moreover, each category of message 208 may include a certain minimum set of data elements present in all messages 208 of that category. For example, alerts 306 or other messages 208 from the vehicle 102 to the service delivery network 202 may include a first set of common information useful for recipients of messages 208 from vehicles, and commands 302 or other messages 208 from the service delivery network 202 to the vehicle 102 may include a second set of common information useful for recipients of messages 208 from the service delivery network 202.

Depending on the type of the message 208 (e.g., the type of command 302), the message 208 may further include additional fields relevant to that specific message type 208. To do so, the name/value pair model may allow for subsets of data to be defined (e.g., information to include in messages 208 from vehicles 102, information to be included in messages 208 from the service delivery network 202, information describing the status of the vehicle 102, etc.) which may then be included in message 208 definitions without requiring redundant redefinition for each type of message 208 requiring the common information. Further, since the fields of the message 208 may be referenced by the vehicles 102 and service delivery network 202 by name or identifier (rather than by raw byte offset into the message 208), the system may allow for the addition of data elements to the message 208 definitions (or to the common information definitions) without undesirably affecting deployed vehicles 102 that implement communication with the service delivery network 202 utilizing a previous version of the message 208 definitions.

With respect to the processing of the various categories of messages 208 published to the topics 206, the vehicle 102 may be configured to execute commands 302 that it receives from the service delivery network 202 in the order in which the commands 302 were received. To do so, the vehicle 102 may be configured to maintain a command queue of received commands 302, to allow the vehicle 102 to execute the received commands 302 from the queue in a first-in-first-out (FIFO) manner. The vehicle 102 may also be configured to execute alerts 306 in the order they take place on vehicle 102 side. To do so, the vehicle 102 may be configured to maintain an alert queue so that it may execute the alerts 306 from the queue in a last-in-first-out (LIFO) manner. In the case of a conflict between a command 302 and an alert 306, the vehicle 102 may be configured to execute the messages 208 in the order they are received from the service delivery network 202 or took place on the vehicle 102 based on time stamps of the messages 208.

The topics 206 may be utilized to allow the messages 208 to be published to or from the appropriate vehicles 102 and in the proper category of message 208. To facilitate the publishing of messages 208 to appropriate topics 206, the topics 206 may be arranged into a topic tree 210. The topic tree 210 may be defined by the service delivery network 202 to provide a structure of the topics 206 and sub-topics 206 that are used in sending messages 208 between the vehicles 102 and the service delivery network 202.

Figure 4:
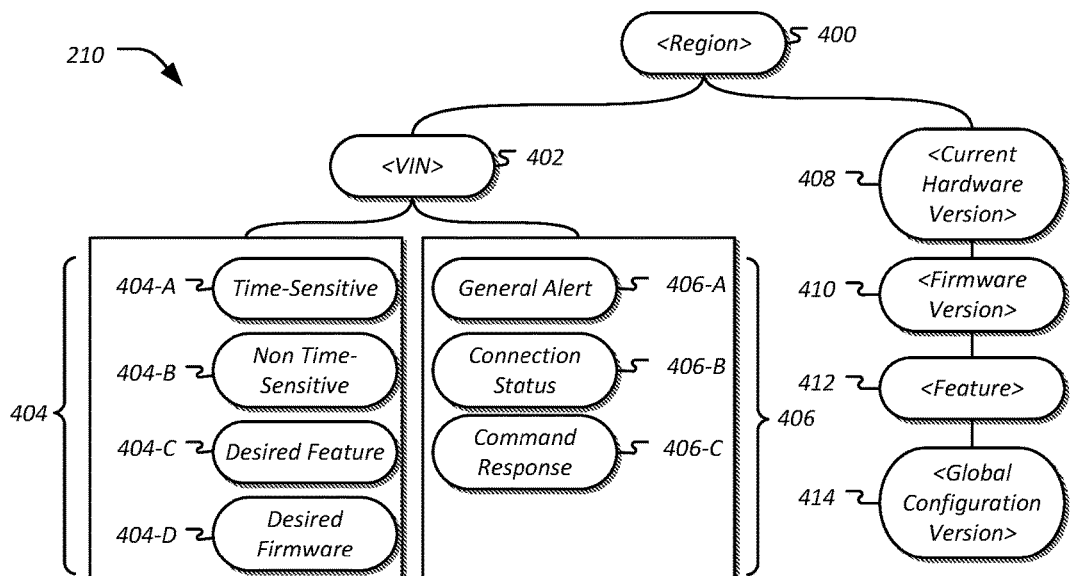
FIG. 4 illustrates an exemplary topic tree for use in vehicle-based computing platform to service delivery network communication.

FIG. 4 illustrates an exemplary topic tree 210 for use in vehicle 102 to service delivery network 202 communication. A computing platform 104, such as a telematics unit of a vehicle 102, may subscribe to nodes of the topic tree 210 that correspond to the installed region, software/firmware version, features, configuration file version of the vehicle 102, etc. It should be noted that the particular layout of the exemplary topic tree 210 is for purpose of illustration only, and other layouts of topic tree 210 may be used. For example, other topic trees 210 may be used by the service delivery network 202 that have more, fewer, or different levels of categorization.

Referring to the topic tree 210 of FIG. 4, a region node 400 of the topic tree 210 may indicate a region for which the sub-topic 206 nodes under the region node 400 may relate. In some cases, the region nodes 400 may represent different regional market areas in which vehicles 102 may be sold, such as North America, Europe, and Asia Pacific. In other examples, the region nodes 400 may relate to other geographical areas, such as countries, states, postal codes, and telephone area codes. By segmenting the topic tree 210 by region, the service delivery network 202 may accordingly publish different information for vehicles 102 associated with different regions.

Under each region node 400, the topic tree 210 may include one or more vehicle-specific nodes 402, where each vehicle-specific node 402 relates to a vehicle 102 associated with the parent region node 400. As one possibility, the service delivery network 202 may create vehicle-specific nodes 402 for vehicles 102 according to VIN or other unique identifier of vehicles 102 that register with the service delivery network 202 as belonging to the particular region. Sub-nodes to the vehicle-specific nodes 402 may be used to further organize topics 206 configured for communication to and from the individual vehicles 102.

For instance, under the vehicle-specific nodes 402, the topic tree 210 may further include one or more vehicle topic nodes 404 for communication to the specific vehicles 102. A vehicle 102 may subscribe to the vehicle topic node 404 that correspond to the VIN or other unique identifier of the vehicle 102, so that the vehicle 102 may be able to receive messages 208 in topics 206 that specifically relate to the vehicle 102 itself.

As one example, a vehicle 102 may subscribe to a time-sensitive update vehicle topic node 404-A for receiving messages 208 (such as time-sensitive commands 302 as discussed in more detail below) for the particular vehicle 102 that are of a time-sensitive nature. Due to their time-sensitive nature, messages 208 posted to the time-sensitive update vehicle topic node 404-A may time out and be removed from the topic 206 if they are not received by the vehicle 102 within an amount of time (e.g., an amount of time specified by the message 208, an amount of time common to all time-sensitive messages 208, etc.). As another example, a vehicle 102 may subscribe to a non-time-sensitive vehicle topic node 404-B for receiving messages 208 for the particular vehicle 102 that are not of a time-sensitive nature (e.g., non-time-sensitive commands 302, also discussed in more detail below).

Updates, such as calendar updates, may be posted to the non-time-sensitive vehicle topic node 404-B, and may remain in the topic 206 until received by the subscribed vehicle 102. As a further example, a vehicle 102 may subscribe to a feature update vehicle topic node 404-C for receiving messages 208 in a topic 206 directed to particular vehicles 102 and relating to updates to the features of the vehicle 102. In this content, a feature may refer to a grouping of configuration parameters applicable to the specified vehicle 102 included in the topic tree 210. A feature may, for example, represent settings to implement an available connected service (e.g., MY FORD MOBILE®) or a customer-specific collection of settings (e.g., a suite of features requested to be enabled and/or disabled for use by a particular fleet purchaser). As yet a further example, a vehicle 102 may subscribe to a firmware update vehicle topic node 404-D for receiving messages 208 in a topic 206 directed to particular vehicles 102 and relating to updates to the firmware of the vehicle 102.

The vehicle-specific nodes 402 of the topic tree 210 may further include one or more vehicle topic nodes 406 for communication from the specific vehicles 102 (e.g., to the service delivery network 202). For example, a general alert topic node 406-A may be used by a vehicle 102 to publish messages 208 (e.g., alerts 306) such as indications of low fuel, erratic driving by the vehicle 102, or periodic current vehicle 102 GPS locations. As another example, a connection status topic node 406-B may be used by a vehicle 102 to publish messages 208 such as the connection status of the vehicle 102 (e.g., alerts 306 indicating whether the vehicle 102 was disconnected and then reconnected to the network 156). As yet a further example, a command response alert topic node 406-C may be used by a vehicle 102 to publish messages 208 such as alerts 306 indicating success or failure of command 302 requested by the service delivery network 202.

Moreover, under each region node 400 the topic tree 210 may include one or more hardware version topic nodes 408, where each hardware version topic node 408 relates to a installed vehicle 102 hardware version that may be shared by multiple vehicles 102 (e.g., a version of the computing platform 104 hardware). These hardware version topic nodes 408 and sub-topic nodes may accordingly be used to reference the vehicles 102 according to hardware version, not according to individual vehicle 102.

Under each hardware version topic node 408, the topic tree 210 may include one or more firmware version nodes 410. Each firmware version node 410 may organize nodes of the topic tree 210 associated with a firmware version that may be installed on the parent tree relationship vehicle 102 hardware for a particular region.

The firmware version node 410 may further include feature nodes 412 organizing nodes of the topic tree 210 associated with a particular feature. As mentioned above, a feature may represent settings to implement an available connected service or a customer-specific collection of settings. Thus, a firmware version may support multiple different features, where different portions of functionality of the firmware are engaged or disengaged for the various features.

The feature nodes 412 may further include configuration version nodes 414, each representing a topic 206 related to a version of a configuration file for the associated feature, firmware version, hardware version, and region. The configuration files may include setting and other information related to the parent features that they configure (e.g., for the version of firmware installed on the version of hardware for the particular region). Because settings and other options may change from version to version, the configuration files may also include a version number of the firmware for which they are compatible.

A vehicle 102 may subscribe to topics of 206 the topic tree 210 that relate to the configuration of the vehicle 102. As one example, a vehicle may subscribe to a vehicle topic node 404 corresponding to the VIN of the vehicle 102, to receive any updates targeting the specific vehicle 102. As another example, a computing platform 104 of a vehicle 102 may subscribe to a configuration version node 414 of the topic tree 210, to receive configuration or other updates corresponding to the installed region, hardware version, firmware version, feature, and global configuration version of the vehicle 102. The subscribed vehicle 102 may check or otherwise be informed of messages 208 published to the subscribed topics 206.

The service delivery network 202 may publish messages 208 into topics 206 of the topic tree 210 for which updates are to be performed. As one possibility, the service delivery network 202 may publish a command 302 into a vehicle topic node 404 to cause a particular vehicle 102 to be informed that an update should be performed for the vehicle 102. As another possibility, the service delivery network 202 may publish a command 302 into a configuration version node 414 to cause any subscribed vehicles 102 having a particular region, hardware version, firmware version, feature, and global configuration version to perform an update.

Referring back to FIG. 2, a user of the vehicle 102 may opt into software updates being performed by the vehicle 102. To facilitate the opt-in process, in some examples the computing platform 104 may provide a prompt to the user via the display 138 and/or audio module 122 requesting the user's authorization. An exemplary prompt may request the user to consent to over-the-air updates to be performed via the in-vehicle modem 144 (or via WiFi or through a data connection of a connected mobile device 152). The consent may be requested once, but utilized across multiple update cycles. As another possibility, the user may opt into over-the-air updates using a mobile device 152 paired or otherwise associated with the vehicle 102 (e.g., by providing consent via a mobile application executed by the mobile device 152, via sending a short message service (SMS) message from the mobile device 152 to a specific number, by use of an authorization webpage accessible from the mobile device 152, etc.).

Once authorized (e.g., by way of receiving button presses or spoken dialog from the user), the computing platform 104 may be configured to query for software updates of the vehicle ECUs 148. This querying may be performed silently, without requiring user input.

The computing platform 104 may be configured to collect information related to the modules of the vehicle 102. The process of collecting data may be referred to as interrogation, and the collected data may be referred to as an interrogator log 212. The information to interrogate may include, as some non-limiting examples, module name, module serial number, VIN, hardware part number, MAC address, part numbers of software applications, languages, and service packs installed on the module, available storage space on the module, and status information regarding the installation of previous updates.

The computing platform 104 may be further configured to determine what information to collect by use of an optimized data identifier list (ODL) file 214 defining the specific information to interrogate and where such information may be located. Notably, the information to collect may include data elements from the vehicle ECUs 148 or other controllers of the vehicle 102, and may be retrieved via the controller area network (CAN) or other vehicle 102 communication architecture supporting data transfer between controllers. The information may also include diagnostic codes and other vehicle state information that may be collected during vehicle 102 servicing by a dealer. The information may also include analytics data including usage and logging data providing insight into usage of various vehicle features. In some cases, the ODL file 214 may be installed as part of an installation of software on the computing platform 104, while in other cases the ODL file 214 may have been previously received according to earlier performed updates (described in greater detail below). As yet a further example, the computing platform 104 may be configured to publish an ODL request to a vehicle-specific topic 206 of the message broker 204 (e.g. the general alert topic 406-A), and receive an ODL 214 file published in response defining what information to interrogate for the particular VIN.

The computing platform 104 may be configured to send the interrogator log 212 to the service delivery network 202. In an example, the computing platform 104 may send the interrogator log 212 to the service delivery network 202 via HTTPS (e.g., by connection of the computing platform 104 to a predefined web address of the service delivery network 202 known to the computing platform 104). Variations on sending the interrogator log 212 to the service delivery network 202 are possible. As another example, the computing platform 104 may be configured to publish the interrogator log 212 to a topic 206 of the message broker 204 specific to the vehicle 102, to be retrieved by the service delivery network 202.

The service delivery network 202 may check the topics 206 to which the vehicle 102 is subscribed. If the vehicle 102 has published the interrogator log 212, the service delivery network 202 may review the current module configuration and current version of the computing platform 104, and determine whether any software updates to the vehicle 102 should be installed. Based on the determination, the service delivery network 202 may identify binaries that should be installed on the vehicle 102 to perform the identified updates. These binaries may be identified in a manifest 216. Moreover, the manifest 216 may specify network locations at which each of the specified update binaries may be retrieved. As one example, the manifest 216 may specify the network locations as URLs served by a web server 218 of the service delivery network 202. In some cases, the binaries may include new versions of files to be installed, while in other cases, the binaries may include incremental updates to be applied to currently installed binaries to update the currently installed binaries from one version to a next version.

To identify the software updates, the service delivery network 202 may be configured to compare the current versions of modules indicated in the interrogator log 212 with the latest version of the modules compatible with the computing platform 104. The service delivery network 202 may be further configured to identify, for any components that should be updated, any additional dependencies that those updated versions may require. Those additional dependencies may further be added to the manifest 216.

Once complete, the service delivery network 202 may send the manifest 216 to the computing platform 104. In an example, the service delivery network 202 may send the manifest 216 to the vehicle 102 via HTTPS (e.g., over the HTTPS connection to which the computing platform 104 sent the interrogator log 212 to the computing platform 104, over a different connection to the same or a different a predefined web address of the service delivery network 202 known to the computing platform 104, etc.). Variations on sending the manifest 216 to the vehicle 102 are possible. For instance, the service delivery network 202 may publish the manifest 216 to a topic 206 of the message broker 204, to be retrieved by the vehicle 102. The computing platform 104 may check the topics 206 to which the vehicle 102 is subscribed.

Regardless of approach, once received, the computing platform 104 may be configured to install the updates indicated by the manifest 216. Based on the manifest 216, the computing platform 104 may be configured to download the updated binaries and/or configurations retrieved from the web server locations specified by the manifest 216. As one example, the manifest 216 may specify the network locations as URLs served by a web server 218 of the service delivery network 202, and the computing platform 104 may download the updated from the URLs specified by the manifest 216. As the updates may be made available from the web server 218 via HTTPS, the computing platform 104 may be able to download the updates using resume functionality available for downloads from web servers 218.

In some examples, to avoid disruption of the current version of software installed to the computing platform 104, the computing platform 104 may be configured to perform the installation to a second installation of the computing platform 104, other than the currently active installation from which the computing platform 104 was booted. The installation of the updates to the second installation may be performed silently, without requiring input from the user.

Upon completion of installation of the software updates specified by the manifest 216, the computing platform 104 may be configured to perform an additional interrogation of the modules of the vehicle 102 to create a new interrogator log 212. Similar to as describe above, the computing platform 104 may create the interrogator log 212, but this time utilizing the received ODL 214, providing an updated definition of what information to interrogate for the currently performed software update. Also, similar to as discussed above, the computing platform 104 may be configured to publish the interrogator log 212 to the message broker 204, to be received by the service delivery network 202. Accordingly, the service delivery network 202 may be automatically updated of the installation status of the vehicle 102, without requiring user HMI interaction.

Figure 5:
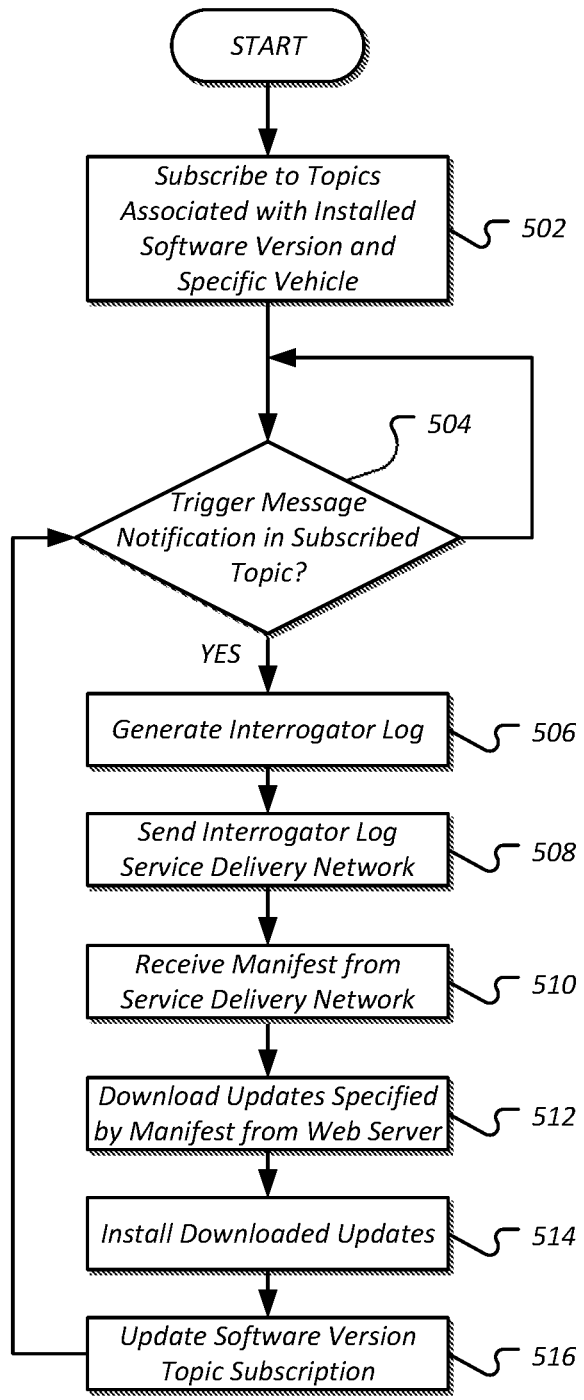
FIG. 5 illustrates an exemplary process for updating software of the computing platform.

FIG. 5 illustrates an exemplary process 500 for updating software of the computing platform 104. The process 500 may be performed, for example, by a computing platform 104 of a vehicle 102 in communication with a service delivery network 202 over a network 156.

At operation 502, the computing platform 104 subscribes to topics 206 of a topic tree 210 in which commands 302 to update the software version or configuration of one or more modules of the vehicle 102 are published. These modules may include, for example the computing platform 104 itself and/or other vehicle ECUs 148. For example, the computing platform 104 may subscribe to a desired feature node 404-C of the topic tree 210 into which vehicle-specific updates for a software component of a module of the vehicle 102 may be published by the service delivery network 202. As another example, the computing platform 104 may subscribe to a configuration version node 414 representing a topic 206 of the topic tree 210 served by the service delivery network 202 and related to the installed version, features, and region of the component or module of the vehicle 102.

At operation 504, the computing platform 104 determines whether a trigger notification message 208 is received in one of the subscribed topics 206. As an example, the service delivery network 202 may publish a trigger notification message 208 in the desired feature node 404-C to target an update to the vehicle 102. As another example, the service delivery network 202 may publish a trigger notification message 208 in the configuration version node 414 to target vehicles 102 having a particular configuration. The vehicle 102 may be notified of or may otherwise receive the notification message 208 due to its subscription to the topics 206 of the topic tree 210. The trigger notification message 208 may indicate to the vehicle 102 that software updates are available. If a notification message 208 is received, control passes to operation 506. Otherwise, control remains at operation 504.

At operation 506, the vehicle 102 generates an interrogator log 212. The interrogator log 212 may include version information of at least one software module installed on the vehicle 102. The information to interrogate may include, as some non-limiting examples, module name, module serial number, VIN, hardware part number, MAC address, part numbers of software applications, languages, and service packs installed on the module, available storage space on the module, and status information regarding the installation of previous updates. The computing platform 104 may be configured to generate the interrogator log 212 according to an ODL 214 defining what information to interrogate and where such information may be located. The information to interrogate may include, for example, requested identifiers from the computing platform 104 and other vehicle ECUs 148 within the vehicle 102. The information may be gathered via the CAN bus or other vehicle network 142, and included in the interrogator log 212. In some cases, the ODL 214 may be received as part of an installation of software on the vehicle 102, while in other cases the ODL 214 may have been previously received according to earlier performed updates.

At operation 508, the vehicle 102 sends the interrogator log 212 to the service delivery network 202. In an example, the computing platform 104 may send the interrogator log 212 to the service delivery network 202 via HTTPS (e.g., by connection of the computing platform 104 to a predefined web address of the service delivery network 202 known to the computing platform 104). Variations on sending the interrogator log 212 to the service delivery network 202 are possible. As another example, the computing platform 104 may publish the interrogator log 212 to a topic 206 of the message broker 204 specific to the vehicle 102, to be retrieved by the service delivery network 202.

At operation 510, the vehicle 102 receives a manifest 216 from the message broker 204. The manifest 216 may indicate one or more binaries to be downloaded and installed by the vehicle 102, as well as other information to use when performing the update, such as updated ODL 214 and/or keys to decrypt the binaries to be downloaded and installed. In an example, the service delivery network 202 may send the manifest 216 to the vehicle 102 via HTTPS (e.g., over the HTTPS connection to which the computing platform 104 sent the interrogator log 212 to the computing platform 104, over a different connection to the same or a different a predefined web address of the service delivery network 202 known to the computing platform 104, etc.). Variations on sending the manifest 216 to the vehicle 102 are possible. For instance, the service delivery network 202 may publish the manifest 216 to a topic 206 of the message broker 204, to be retrieved by the vehicle 102. The computing platform 104 may check the topics 206 to which the vehicle 102 is subscribed.

At operation 512, the vehicle 102 downloads the binaries specified by the manifest 216. For example, the computing platform 104 of the vehicle 102 may download the binaries from the web server 218 of the service delivery network 202 at network locations specified by the manifest 216. The computing platform 104 may also decrypt the binaries into decrypted binaries according to the received keys.

At operation 514, the computing platform 104 installs the software update. For example, the computing platform 104 may execute or otherwise apply the firmware update to the installed firmware version to update the firmware version. In some cases, the computing platform 104 may be further configured to publish a message 208 to a command response alert topic node 406-C of the vehicle 102 to alert the service delivery network 202 of success or failure of the software update. Upon receiving a message 208 indicating success of the software update, the service delivery network 202 may update its records of the installed configuration status of the vehicle 102. As another possibility, if the software update fails, the computing platform 104 may publish a failure message 208 to the command response alert topic node 406-C, and the process 600 may end, or possibly pass control to operation 512 to retry the download and installation.

At operation 516, the computing platform 104 updates the topic 206 subscriptions of the vehicle 102. For example, the computing platform 104 may unsubscribe the vehicle 102 from the configuration version node 414 of the topic tree 210 and the firmware version node 410 for the old version, and subscribe to the configuration version node 414 of the topic tree 210 related to the new installed version of the firmware. Thus, the vehicle 102 may be able to receive further trigger notification messages 208 corresponding to the updated configuration of the vehicle 102. After operation 516, control passes to operation 504.

Thus, a service delivery network 202 may utilize a topic tree 210 to selectively provide updates to vehicles 102 according to installed software version, such as firmware version of a module of the vehicle 102, or a software version of an application installed on the computing platform 104, without affecting the vehicle 102 installations of software versions on vehicles 102 of different versions. Moreover, these updates may be provided incrementally and automatically over-the-air to the vehicles 102, without incurring manufacturer or dealer technician costs. As the updates may be made available from the web server 218, the vehicles 102 may be able to download the updates using resume functionality available from web server 218 downloads. Moreover, as the interrogator log 212 generation and upload is performed responsive to a service notification that updates are available, periodic polling by the vehicle 102 for updates is avoided, thereby avoiding the resource use of periodically generating and uploading interrogator logs 212.

Computing devices described herein, such as the computing platform 104, mobile devices 152, service delivery network 202, and message broker 204, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
a vehicle, subscribed to a topic maintained by a message broker and associated with the vehicle, including at least one controller programmed to
send, to a service delivery network server, an interrogator log enumerating configuration information of the vehicle generated responsive to a trigger message published to the topic by the server, and
retrieve a manifest indicating network locations of updates determined using the interrogator log.

2. The system of claim 1, wherein the at least one controller is further programmed to include, in the interrogator log, (i) current state information of at least one software component installed on the vehicle and (ii) diagnostic codes of at least one software component installed on the vehicle.

3. The system of claim 1, wherein the at least one controller is further programmed to generate the interrogator log based on a data identifier list defining the configuration information to include in the interrogator log and on which of a plurality of vehicle electronic control units (ECUs) the information is located.

4. The system of claim 1, wherein the topic is associated with a vehicle identification number (VIN) of the vehicle.

5. The system of claim 1, wherein the at least one controller is further programmed to:
download the updates from the network locations;
install the updates to the vehicle;
generate a second interrogator log responsive to completion of the install of the updates; and
send the second interrogator log to the server.

6. The system of claim 5, wherein the at least one controller is further programmed to download the updates from the network locations over one or more secure hyper-text transport protocol (HTTPS) connections.

7. The system of claim 1, wherein the at least one controller is further programmed to:
send the interrogator log to the service delivery network server over a secure hyper-text transport protocol (HTTPS) connection; and
retrieve the manifest from the service delivery network server over the HTTPS connection.

8. A method comprising:
receiving, by a vehicle processor, a message published by a service delivery network to a topic maintained by a message broker and associated with a vehicle indicating vehicle update availability;
generating an interrogator log enumerating vehicle configuration information responsive to receiving the message;
sending the interrogator log to the service delivery network; and
retrieving, from the service delivery network, a manifest indicating network locations of updates determined using the interrogator log.

9. The method of claim 8, further comprising including, in the interrogator log, (i) current state information of at least one software component installed on the vehicle and (ii) diagnostic codes of at least one software component installed on the vehicle.

10. The method of claim 8, further comprising generating the interrogator log based on a data identifier list defining the configuration information to include in the interrogator log and on which of a plurality of vehicle electronic control units (ECUs) the information is located.

11. The method of claim 8, wherein the topic is associated with a vehicle identification number (VIN) of the vehicle.

12. The method of claim 8, further comprising:
downloading the updates from the network locations;
installing the updates to the vehicle;
generating a second interrogator log responsive to completion of the install of the updates; and sending the second interrogator log to the service delivery network.

13. The method of claim 12, wherein the network locations include at least one universal resource locator (URL) served by a web server of the service delivery network.

14. A non-transitory computer-readable medium including instructions that when executed by a computing system of a vehicle cause the vehicle to:
retrieve a manifest of service delivery network locations for updates served by a web server, the updates selected based on a log having vehicle configuration information compiled by the vehicle computing system in response to receiving a message published to a vehicle-subscribed topic maintained by a message broker indicating vehicle update availability.

15. The medium of claim 14, wherein the log includes (i) current state information of at least one software component installed on the vehicle and (ii) diagnostic codes of at least one software component installed on the vehicle.

16. The medium of claim 14, wherein the log is generated based on a data identifier list defining the configuration information to include in the log and on which of a plurality of vehicle electronic control units (ECUs) the information is located.

17. The medium of claim 14, wherein the topic is associated with a vehicle identification number (VIN) of the vehicle.

18. The medium of claim 14, further comprising instructions that, when executed by the computing system of the vehicle, cause the vehicle to:
download the updates from the network locations;
install the updates to the vehicle;
generate a second log after the install; and
publish the second log to the topic.

19. The medium of claim 18, wherein the network locations include at least one universal resource locator (URL) served by a web server of the service delivery network.

* * * * *